United States Patent
Lee et al.

(10) Patent No.: US 12,202,240 B2
(45) Date of Patent: Jan. 21, 2025

(54) SOLAR PANEL DISASSEMBLING APPARATUS

(71) Applicant: WON KWANG S&T CO., LTD., Incheon (KR)

(72) Inventors: Sang Hun Lee, Incheon (KR); Jun Kee Kim, Seoul (KR); Cheong Min Noh, Incheon (KR); Geun Sik Cho, Incheon (KR); Do Yun Lee, Incheon (KR)

(73) Assignee: WON KWANG S&T CO., LTD., Incheon (KR)

( * ) Notice: Subject to any disclaimer, the term of this patent is extended or adjusted under 35 U.S.C. 154(b) by 324 days.

(21) Appl. No.: 17/835,449

(22) Filed: Jun. 8, 2022

(65) Prior Publication Data
US 2023/0211597 A1     Jul. 6, 2023

(30) Foreign Application Priority Data
Jan. 5, 2022   (KR) .................. 10-2022-0001791

(51) Int. Cl.
*B32B 43/00*     (2006.01)
*B09B 3/35*      (2022.01)
(Continued)

(52) U.S. Cl.
CPC .............. *B32B 43/003* (2013.01); *B09B 3/35* (2022.01); *B26D 1/0006* (2013.01); *B26D 1/50* (2013.01);
(Continued)

(58) Field of Classification Search
CPC .......... B32B 43/003; B09B 5/00; B09B 3/35; B09B 3/00; B09B 2101/15; B09B 3/40;
(Continued)

(56) References Cited

U.S. PATENT DOCUMENTS 4,363,251 A  * 12/1982  Carlson .............. B26D 7/0625
                                                    83/425.2
7,150,804 B2 * 12/2006  Tajima ..................... G09F 7/18
                                                    156/707
(Continued)

FOREIGN PATENT DOCUMENTS

CN          102856439 A       1/2013
EP             827819 A1 *   3/1998   ......... B23D 57/0023
(Continued)

*Primary Examiner* — Ghassem Alie
(74) *Attorney, Agent, or Firm* — The PL Law Group, PLLC

(57) ABSTRACT

A solar panel disassembling apparatus according to an embodiment of the present disclosure separates a glass plate of a solar panel and a film layer bonded to the glass plate from each other. The solar panel disassembling apparatus includes a supply module that stands and fixes the solar panel such that a bond line between the glass plate and the film layer is exposed upward and downward and that moves the solar panel in a parallel direction parallel to a bonding surface between the glass plate and the film layer, and a wire-shaped cutting blade that is disposed in front of the solar panel in a movement direction of the solar panel to (Continued)

have a distance from the supply module, is disposed in parallel to the bonding surface, and separates the glass plate and the film layer from each other.

17 Claims, 10 Drawing Sheets

(51) Int. Cl.
  *B26D 1/00* (2006.01)
  *B26D 1/50* (2006.01)
  *B09B 101/15* (2022.01)

(52) U.S. Cl.
  CPC .... *B09B 2101/15* (2022.01); *B26D 2001/008* (2013.01)

(58) Field of Classification Search
  CPC . B26D 1/547; B26D 1/50; B26D 3/28; B26D 1/0006; B26D 2001/008; B26F 3/002; Y02W 30/20; Y02W 30/51; H01L 31/048; H01L 31/1876; H04N 7/18; Y20W 30/82
  USPC .......... 83/803; 156/252, 304, 582; 29/426.4, 29/4.2, 3, 762; 445/2
  See application file for complete search history.

(56) References Cited

U.S. PATENT DOCUMENTS

| | | | | |
|---|---|---|---|---|
| 8,065,995 | B2 * | 11/2011 | Bakshi | B28D 5/0076 |
| | | | | 125/16.02 |
| 11,267,158 | B1 * | 3/2022 | Kilgore | B27C 7/00 |
| 2010/0064871 | A1 * | 3/2010 | Koch | B28B 11/16 |
| | | | | 83/692 |
| 2010/0199818 | A1 * | 8/2010 | Lee | B26D 1/547 |
| | | | | 83/16 |
| 2016/0151844 | A1 * | 6/2016 | Go | B23D 51/16 |
| | | | | 83/785 |
| 2018/0186026 | A1 * | 7/2018 | Annequin | B26F 3/12 |

FOREIGN PATENT DOCUMENTS

| | | | | |
|---|---|---|---|---|
| EP | 2993006 A2 * | 3/2016 | ........ | B23D 57/0023 |
| KR | 10-2091346 B1 | 3/2020 | | |
| KR | 10-2101583 B1 | 5/2020 | | |
| KR | 10-2154030 B1 | 9/2020 | | |
| KR | 10-2021-0015287 A | 2/2021 | | |
| KR | 10-2246155 B1 | 4/2021 | | |
| WO | WO-2015173513 A1 * | 11/2015 | ........... | B26B 27/002 |

\* cited by examiner

FIG. 2
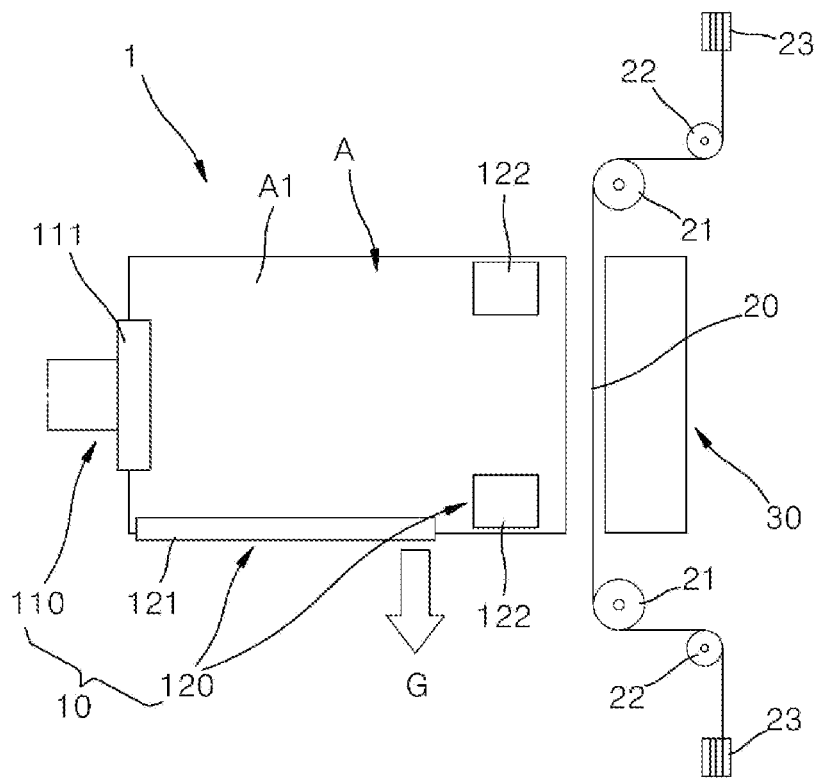
(a)
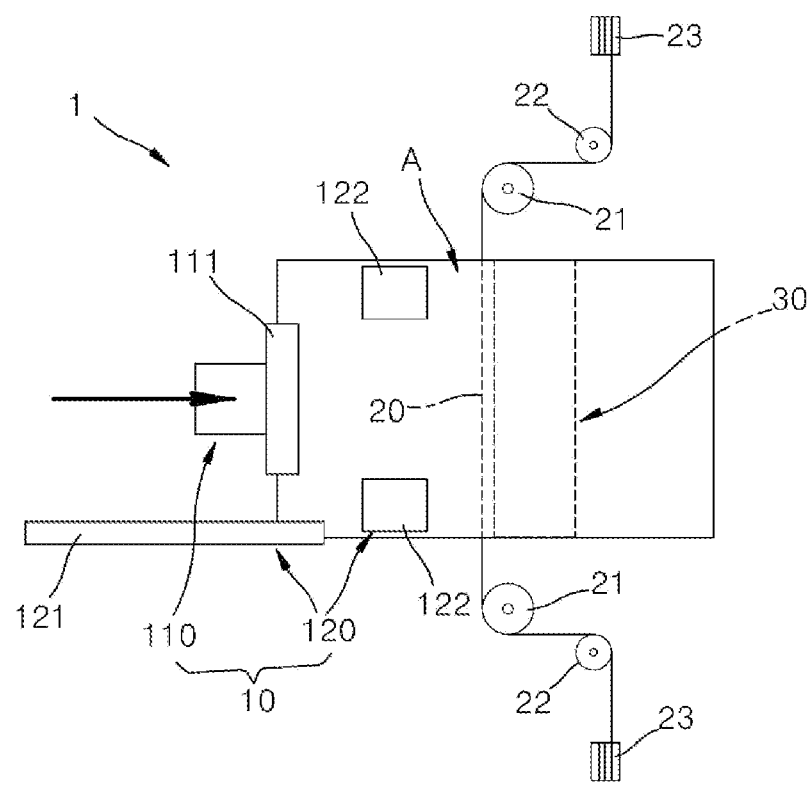
(b)

(a) FRONT VIEW  (b) PLAN VIEW

FIG. 4
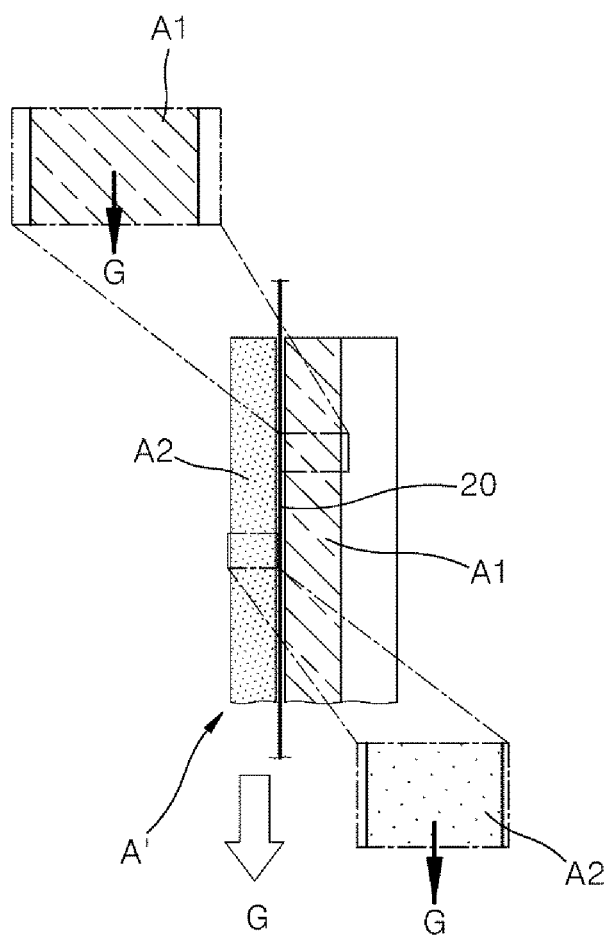 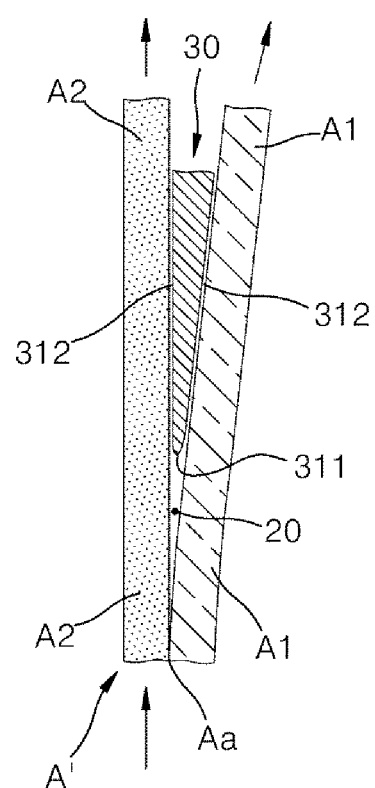
(a) FRONT VIEW  (b) PLAN VIEW

SOLAR PANEL DISASSEMBLING APPARATUS

CROSS REFERENCE TO RELATED APPLICATIONS AND CLAIM OF PRIORITY

This application claims priority to the benefit of Korean Patent Application No. 10-2022-0001791 filed in the Korean Intellectual Property Office on Jan. 5, 2022, the entire contents of which are incorporated herein by reference.

BACKGROUND

1. Field of the Invention

The present invention relates to a solar panel disassembling apparatus, and more specifically to a solar panel disassembling apparatus that effectively disassembles a double-sided or single-sided solar panel by using a wire-shaped cutting blade.

2. Description of the Related Art

This invention was made with government support under the national R&D program of South Korea (Project Identification Number: 1485017207; Project Number: 2020003100003; Ministry Name: Ministry of Environment; Project Management (Specialized) Institute Name: Korea Environmental Industry & Technology Institute; Research Program Title: Technology Development Program for Improvement in Cyclical Availability of Recycling Inhibitory Product; Research Project Title: Technology Development of Collecting Discarded Solar Panel and Collecting Crush-Based Valuable Material; Contribution Ratio: 1/1; Project Performing Agency Name: WonKwang S&T Co., Ltd.; Research Period: May 21, 2020 to Dec. 31, 2022) awarded by Korea Ministry of Environment (MOE).

A solar panel is core equipment in the solar power generation. The solar panel has a structure in which a solar-cell integrated film layer is bonded to a glass plate. Recently, a double-sided solar panel in which glass plates are bonded to both surfaces of a film layer is also manufactured.

Since efficiency of the solar power generation has been significantly improved since the development thereof, many solar power generating plants are currently constructed. The solar power generating plants are applied to various regions such as a region to which an existing power generating plant is difficult to apply or an uncontaminated region sensitive to pollution.

The solar power generating plants have a maintenance problem of replacement or disposal of solar panels when a service life of solar cells is ended. Hence, old solar panels are discarded through a complicated disposal process since the solar panel has a structure in which a glass plate and a film layer are stacked on each other.

In particular, there is a demand for a method for processing a solar panel from which a glass plate is not crushed but disassembled in terms of resource utilization; however, a problem arises in that a film layer bonded to a glass plate is not easy to cleanly remove by using a scraper or the like in the related art. The problem grows bigger in a case of a double-sided panel since both glass plates on both surfaces should be disassembled. No appropriate solution to the problem is provided, and thus there is a demand for a technical alternative.

SUMMARY

In order to solve such problems, a technical object of the present invention is to provide a solar panel disassembling apparatus that effectively disassembles a double-sided or single-sided solar panel by using a wire-shaped cutting blade.

Technical objects of the present invention are not limited to the object mentioned above, and the following description enables those skilled in the art to clearly understand other unmentioned technical objects.

According to the present invention, there is provided a solar panel disassembling apparatus that separates a glass plate of a solar panel and a film layer bonded to the glass plate from each other, the solar panel disassembling apparatus including: a supply module that stands and fixes the solar panel such that a bond line between the glass plate and the film layer is exposed upward and downward and that moves the solar panel in a parallel direction parallel to a bonding surface between the glass plate and the film layer; and a wire-shaped cutting blade that is disposed in front of the solar panel in a movement direction of the solar panel to have a distance from the supply module, is disposed in parallel to the bonding surface, and separates the glass plate and the film layer from each other.

The supply module may hold and move the solar panel in the parallel direction such that loads of the glass plate and the film layer are not perpendicularly applied to the bonding surface.

The solar panel may be a double-sided panel including a pair of glass plates bonded to both surfaces of the film layer, and the wire-shaped cutting blade may be configured of a pair of double blades which is disposed side by side to simultaneously separate the pair of glass plates from the film layer.

The supply module may move the solar panel in the parallel direction while supporting an edge of the solar panel such that a load of the solar panel is concentrated on at least one edge of the glass plate and the film layer.

The wire-shaped cutting blade may be intersected perpendicularly to a parallel movement direction of the solar panel.

The wire-shaped cutting blade may be disposed obliquely with respect to the parallel movement direction of the solar panel such that a contact area changes while the wire-shaped cutting blade comes into contact with the solar panel.

The bonding surface may be parallel to the direction of gravity, and the parallel movement direction of the solar panel may be perpendicular to the direction of gravity.

The bonding surface and the parallel movement direction of the solar panel may be both parallel to the direction of gravity.

The bonding surface and the parallel movement direction of the solar panel may be both obliquely inclined with respect to the direction of gravity.

The glass plate of the solar panel may be disposed above the film layer in the direction of gravity such that the cut film layer is separated by self-load from the glass plate.

The supply module may include a first holding unit that holds one edge of the solar panel and fixes the solar panel and a first guide unit that comes into contact with another part of the solar panel with which the first holding unit does not come into contact and that guides the solar panel in a movement direction.

The supply module may include a second holding unit that holds outer surfaces of the solar panel and fixes the solar panel and a second guide unit that comes into contact with another part of the solar panel with which the second holding unit does not come into contact and that guides the solar panel in a movement direction.

The solar panel disassembling apparatus may further include at least one wedge body that is disposed behind the wire-shaped cutting blade in the movement direction of the solar panel and has an edge facing the wire-shaped cutting blade and two contact surfaces which are parted at an angle with each other from the edge to come into contact with the film layer and the glass plate, respectively.

The wire-shaped cutting blade may include at least one of a wire saw which is driven in a tension direction, and a heating wire which performs melting between the glass plate and the film layer with heat to cut the glass plate and the film layer from each other.

BRIEF DESCRIPTION OF THE DRAWINGS

FIG. 2 is a side view illustrating a disassembling operation of the solar panel disassembling apparatus illustrated in FIG. 1;

FIG. 4 is an enlarged view obtained by enlarging front and plan views of a solar panel in a disassembling process of a single-sided solar panel in accordance with a disassembling operation illustrated in FIG. 2;

DETAILED DESCRIPTION OF THE PREFERRED EMBODIMENTS

Advantages, features, and methods for achieving the advantages and the features are to be more clearly described with reference to embodiments which will be described below in detail together with the accompanying drawings. However, the present invention is not limited to the embodiments disclosed hereinafter but can be realized in various different embodiments; simply, the embodiments are provided to complete the disclosure of the present invention and completely inform those with ordinary skill in the art to which the present invention pertains of the scope of the present invention, and the present invention is only defined by the claims. Through the entire specification, the same reference signs represent the same configurational elements, respectively.

Hereinafter, a solar panel disassembling apparatus according to the present invention will be described in detail with reference to FIGS. 1 to 10. First, a first embodiment of the present invention will be described in detail with reference to FIGS. 1 to 6, and then second, third, and fourth embodiments will be described in detail based on the description of the first embodiment.

Figure 1:
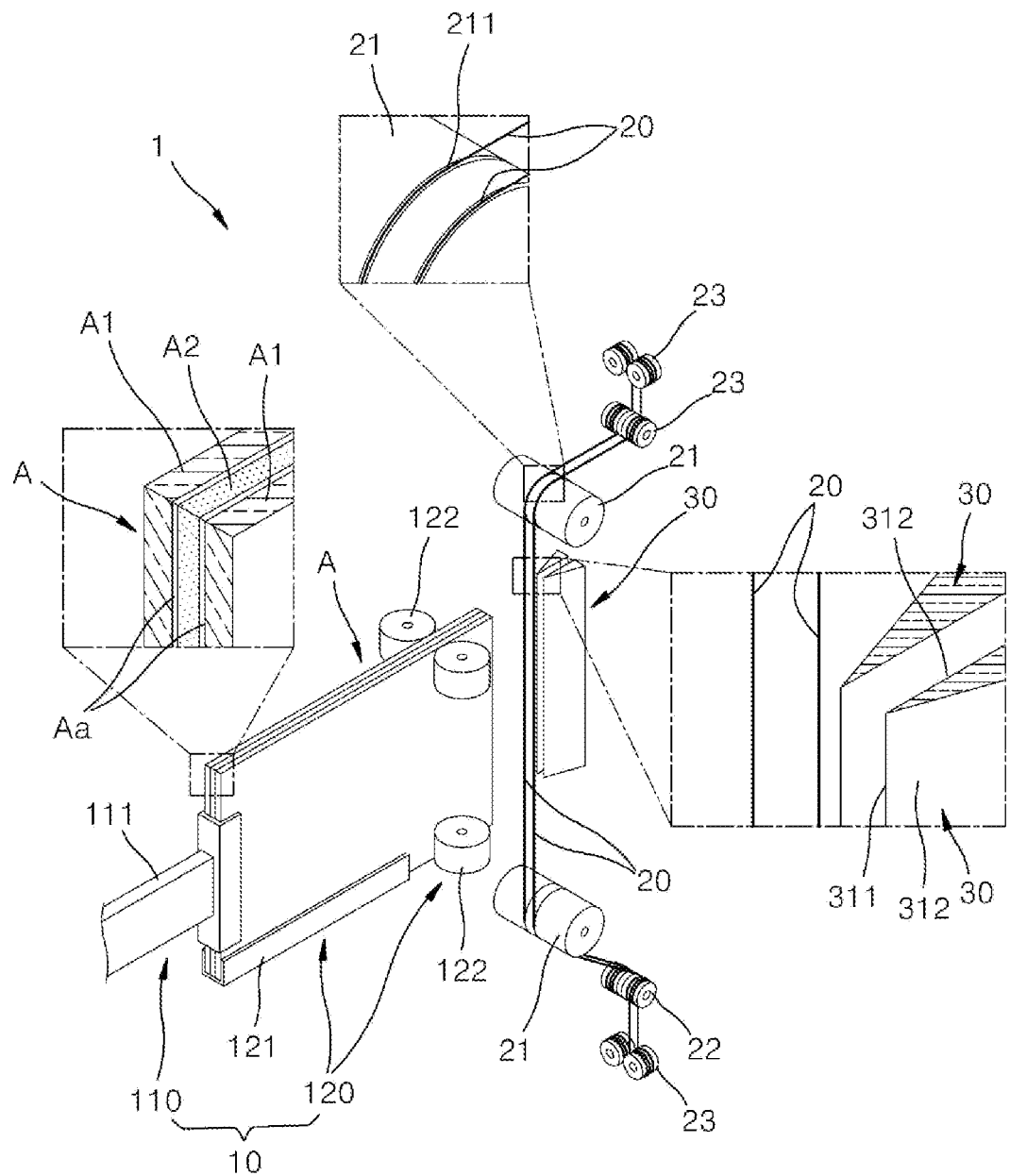
FIG. 1 is a perspective view illustrating a solar panel disassembling apparatus according to a first embodiment of the present invention.

FIG. 1 is a perspective view illustrating a solar panel disassembling apparatus according to the first embodiment of the present invention.

With reference to FIG. 1, a solar panel disassembling apparatus 1 inserts a wire-shaped cutting blade 20 and between a glass plate A1 and a film layer A2 of a solar panel A and performs cutting therebetween. The wire-shaped cutting blade 20 has a very thin thickness (can have a diameter of 100 μm or smaller) and thus can function as a very sharp blade when being pulled by tension.

The wire-shaped cutting blade 20 forms accurate cut surfaces by applying high pressure to a contact surface; however, since a small gap is formed between cut surfaces and a wire has little volume, a problem of recontact of the cut surfaces arises. Consequently, the wire-shaped cutting blade is very difficult to use in a solar panel discarding process. For example, when a solar panel is laid horizontally as in a general process (scraping or the like) to perform cutting work or the like on the solar panel, there is a concern that cut portions will be re-bonded by self-load.

In the present invention, the problem is solved by performing a process in a state of standing the solar panel A vertically such that a bond line Aa between the glass plate A1 and the film layer A2 is exposed upward and downward as illustrated in the drawing. Through repeated technical supplement and study for more effective disposal of a discarded solar panel, the inventors of the present invention have found that an accurate and clean cut surface is formed and a process speed is increased only when the process is performed in the state of standing the solar panel A vertically. The present invention is achieved by significantly improving a method for disposing of a discarded solar panel based on the study.

The solar panel disassembling apparatus 1 of the present invention is specifically configured as follows. The solar panel disassembling apparatus 1 separates the glass plate A1 of the solar panel A and the film layer A2 bonded to the glass plate A1 from each other, the solar panel disassembling apparatus 1 including: a supply module 10 that stands and fixes the solar panel A such that the bond line Aa between the glass plate A1 and the film layer A2 is exposed upward and downward and that moves the solar panel A in a parallel direction parallel to a bonding surface between the glass plate A1 and the film layer A2; and the wire-shaped cutting blade 20 that is disposed in front of the solar panel A in a movement direction of the solar panel A to have a distance from the supply module 10, is disposed in parallel to the bonding surface, and separates the glass plate A1 and the film layer A2 from each other.

In several embodiments of the present invention, the supply module 10 holds and moves the solar panel A in the parallel direction such that loads of the glass plate A1 and the film layer A2 are not perpendicularly applied to the bonding surface between the glass plate and the film layer. In this manner, bonding surfaces cut by a fine wire are impeded from coming into recontact with each other, and thus a separation state of the glass plate A1 from the film layer A2 can be effectively maintained. Since such a technical idea can be realized into various embodiments as will be described below and the corresponding embodiments are not provided to limit the present invention, there is no need for the technical idea of the present invention to be limited to the embodiments.

The solar panel A which is a disposal target of the present invention includes the glass plate A1 and the film layer A2 bonded to the glass plate A1. Solar cells are integrated in the film layer A2, and the solar-cell integrated film layer A2 having a relatively thin film shape is stacked on the glass plate A1. The glass plate A1 and the film layer A2 are bonded to each other, and thus the bond line Aa is formed between the glass plate A1 and the film layer A2 as illustrated in FIG. 1.

The bond line Aa is located at the perimeter of an inner bonding surface. Since the bonding surface between the glass plate A1 and the film layer A2 is formed along the glass plate A1 having both surfaces which are parallel to each other, the bonding surface is set as a surface that is formed inside the bond line Aa to be parallel to an outer surface of the glass plate A1.

The 'bonding surface' is a surface observed in a state where bonding of the solar panel A is completed, and a surface formed by disassembling the solar panel A and then cutting the bonding surface with the wire-shaped cutting blade 20 is referred to as a 'cut surface'.

As illustrated in FIG. 1, the solar panel A is a double-sided panel including a pair of glass plates A1 bonded to both surfaces of the film layer A2, and the wire-shaped cutting blades 20 can be configured of a pair of double blades which is disposed side by side to simultaneously separate the pair of glass plates A1 from the film layer.

Since a scraper or the like in the related art has a structure in which a surface of the solar panel A is pressed such that a load has to be applied in a direction perpendicular to the bonding surface, the glass plates A1 at both sides are difficult to separate simultaneously from the solar panel. According to the present invention, as not only the double-sided solar panel A but also the single-sided solar panel (see sign A' in FIGS. 4 and 9) in the related art are both supported such that a load is not applied in a direction perpendicular to the bonding surface, both the solar panels can be disassembled by the wire-shaped cutting blade 20 with accuracy.

A configuration, an operation, and an effect of the present invention are described in more detail with reference to the first embodiment of the present invention.

The supply module 10 stands and fixes the solar panel A such that the bond line Aa between the glass plate A1 and the film layer A2 of the solar panel A is exposed upward and downward, and the supply module moves the solar panel A in the parallel direction parallel to the bonding surface between the glass plate A1 and the film layer A2. As described above, the bonding surface is formed inside the bond line Aa to be parallel to an outer surface of the glass plate A1. In the first embodiment, the bonding surface can be parallel to the direction of gravity, and the parallel movement direction of the solar panel A can be a direction perpendicular to the direction of gravity.

FIG. 2 is a side view illustrating a disassembling operation of the solar panel disassembling apparatus illustrated in FIG. 1.

With reference to FIG. 2, the solar panel A is stood to be parallel to the direction of gravity G (perpendicular to the ground), and thus the bonding surface can be set in parallel to the direction of gravity (in a perpendicular direction to the ground). The supply module 10 can stand the solar panel A vertically as described above and then can move the solar panel in a parallel direction perpendicular to the direction of gravity G (in a direction parallel to the ground) (refer to (b) of FIG. 2). Consequently, the solar panel is vertically stood during movement, so loads of the glass plate A1 and the film layer A2 are only applied in a direction parallel to the bonding surface without being perpendicularly applied to the bonding surface (refer to FIGS. 3 and 4).

In this respect, the supply module 10 can move the solar panel A in the parallel direction while supporting an edge of the solar panel A such that a load of the solar panel A is concentrated on at least one edge of the glass plate A1 and the film layer A2. The supply module 10 having one of such structures can include a first holding unit that holds one edge of the solar panel A and fixes the solar panel A and a first guide unit that comes into contact with another part of the solar panel A with which the first holding unit does not come into contact and that guides the solar panel A in a movement direction.

With reference to FIGS. 1 and 2, the holding unit 110 can include a horizontal moving pusher 111, and the guide unit 120 can include a horizontal guide bar 121 and guide rollers 122. The horizontal moving pusher 111 is an example of the first holding unit that holds an edge of the solar panel A and fixes the solar panel A, and the horizontal guide bar 121 and the guide rollers 122 are examples of the first guide unit that comes into contact with another part of the solar panel A with which the first holding unit does not come into contact and that guides the solar panel A in the movement direction. In the first embodiment, the first holding unit and the first guide unit are realized as described above.

However, realized examples of the supply module 10 does not need to be limited thereto, and the supply module 10 in another embodiment can include a second holding unit that holds outer surfaces of the solar panel A and fixes the solar panel A and a second guide unit that comes into contact with another part of the solar panel A with which the second holding unit does not come into contact and that guides the solar panel A in a movement direction.

For example, the second holding unit can be configured of supply rollers (not illustrated) that comes into contact with both surfaces of the solar panel A and pressurizes and transports the solar panel A. The solar panel A can be stood between the supply rollers by adjusting an axial direction of the supply rollers to a vertical direction. The second guide unit can be configured of a guide bar (not illustrated) that is disposed at a different side at which the supply rollers are not disposed and that guides the solar panel A.

That is, a configuration of the supply module 10 does not need to be limited to a configuration in which a pusher or the like is included, and the supply module can also be realized to have a configuration in which a unit such as a roller comes into contact with the other part of the solar panel and pressurizes and transports the solar panel. In second to fourth embodiments which will be described below, realized examples of the supply module 10 can also be modified to have the configuration described above. Incidentally, the description is provided with a supply structure such as a pusher which is driven in a straight line as a basic realized example.

The supply module 10 is formed by combining the holding unit 110 and the guide unit 120. The horizontal moving pusher 111 can have a holding structure such as a holder which can hold a side edge of the solar panel A and stand the solar panel vertically, the holding structure being provided at an end of the horizontal moving pusher, and the horizontal moving pusher can be moved on a straight line in a direction perpendicular to the direction of gravity to move the solar panel A in the parallel direction. A method for providing driving power to the horizontal moving pusher 111 can be performed by using a linear actuator and/or various mechanical structures for converting rotational motion into rectilinear motion.

The horizontal guide bar 121 can be formed by a bar-shaped guide structure which is positioned in a direction perpendicular to the direction of gravity. The horizontal guide bar 121 can come into contact with a lower end portion of the solar panel A. A length, a width, or the like of the horizontal guide bar 121 can be adjusted as necessary. The guide rollers 122 can come into contact with the outer surfaces of the solar panel A without applying actual pressure. For example, the guide rollers 122 can be disposed at both sides of the solar panel A to have a distance equal to a thickness of the solar panel A with the direction of gravity as an axial direction.

The bonding surface of the solar panel A is placed to be parallel to the direction of gravity G as illustrated in (a) of FIG. 2 by using the supply module 10, and the movement direction of the solar panel A can be set to be perpendicular to the direction of gravity G as illustrated in (b) of FIG. 2. Consequently, the solar panel can be cut while being moved in a direction parallel to the ground in a state where the solar panel A is stood to be perpendicular to the ground by the supply module 10.

With reference to FIGS. 1 and 2, the wire-shaped cutting blade 20 is disposed in front of the solar panel A in the movement direction of the solar panel A to have a distance from the supply module 10. The wire-shaped cutting blade 20 can be located on the bonding surface of the glass plate A1 and the film layer A2, can be disposed to be parallel to the bonding surface, and can be inserted into the bonding surface through the bond line Aa. Such disposition enables the wire-shaped cutting blade 20 to pass between the glass plate A1 and the film layer A2 and separate the glass plate A1 and the film layer A2 from each other.

As illustrated in FIG. 2, the wire-shaped cutting blade 20 is intersected perpendicularly to a parallel movement direction of the solar panel A. In the disposition, the wire-shaped cutting blade 20 can be disposed to be parallel to the direction of gravity G. However, the disposition of the wire-shaped cutting blade 20 does not need to be limited thereto, and the wire-shaped cutting blade 20 can be used by being disposed obliquely at a constant angle with respect to the movement direction of the solar panel A.

The wire-shaped cutting blade 20 can include a structure for producing tension. For example, one or a plurality of drive rollers 21, 22, and 23 having a groove 211 can be disposed at both ends of the wire-shaped cutting blade 20 to pull the cutting blade by tension. The cutting blade can be driven in a tension direction by rotating the rollers while the tension is maintained. Hence, the wire-shaped cutting blade 20 can cut the solar panel A while traveling in a length direction. The wire-shaped cutting blade 20 can be a wire saw which is driven in the tension direction.

An example illustrated in the drawings has a structure in which the wire-shaped cutting blade 20 can be wound around or unwound with the plurality of drive rollers 21, 22, and 23; however, both ends of the wire-shaped cutting blade 20 do not need to have a distance from each other. Even in the illustrated example, the wire-shaped cutting blade 20 can have a configuration in which both ends of the wire-shaped cutting blade are connected to each other into a track shape to perform repeated rotation. Desirably, the wire-shaped cutting blade 20 can be modified to have a configuration in which both ends thereof are connected to each other like a caterpillar track.

The wire-shaped cutting blade 20 can be formed by a heating wire which performs melting between the glass plate A1 and the film layer A2 with heat to cut the glass plate and the film layer from each other. A structure in which the wire-shaped cutting blade is driven to have tension applied by rollers or the like can also be applied to the heating wire-shaped cutting blade 20. However, the heating wire does not need to be driven, and a fixed structure can be applied thereto as long as the heating wire can perform cutting even when being fixed in a state where tension is applied to the heating wire. The wire-shaped cutting blade 20 can be formed by at least one of the wire saw which is driven in the tension direction, and the heating wire which performs melting between the glass plate A1 and the film layer A2 with heat to cut the glass plate and the film layer from each other. Double blades can also be formed by combining the heating wire and the wire saw.

At least one wedge body 30 can be disposed behind the wire-shaped cutting blade 20. As illustrated in FIG. 1, the wedge bodies 30 can be disposed behind the wire-shaped cutting blade 20 in the movement direction of the solar panel A and has an edge 311 facing the wire-shaped cutting blade 20 and two contact surfaces 312 which are parted at an angle with each other from the edge 311 to come into contact with the film layer A2 and the glass plate A1, respectively (refer to FIGS. 3 and 4).

The number of wedge bodies 30 can be adjusted correspondingly to the number of the wire-shaped cutting blades 20. As described in the embodiment, when the wire-shaped cutting blades 20 are configured of double blades to simultaneously separate the pair of glass plates A1 from the solar panel, a pair of wedge bodies 30 can also be disposed behind the wire-shaped cutting blades 20.

The solar panel disassembling apparatus 1 cuts the solar panel A by the configuration described above as follows. Hereinafter, with reference to FIGS. 3 to 6 together with FIG. 2, an operation of the solar panel disassembling apparatus 1 will be described in more detail.

Figure 3:
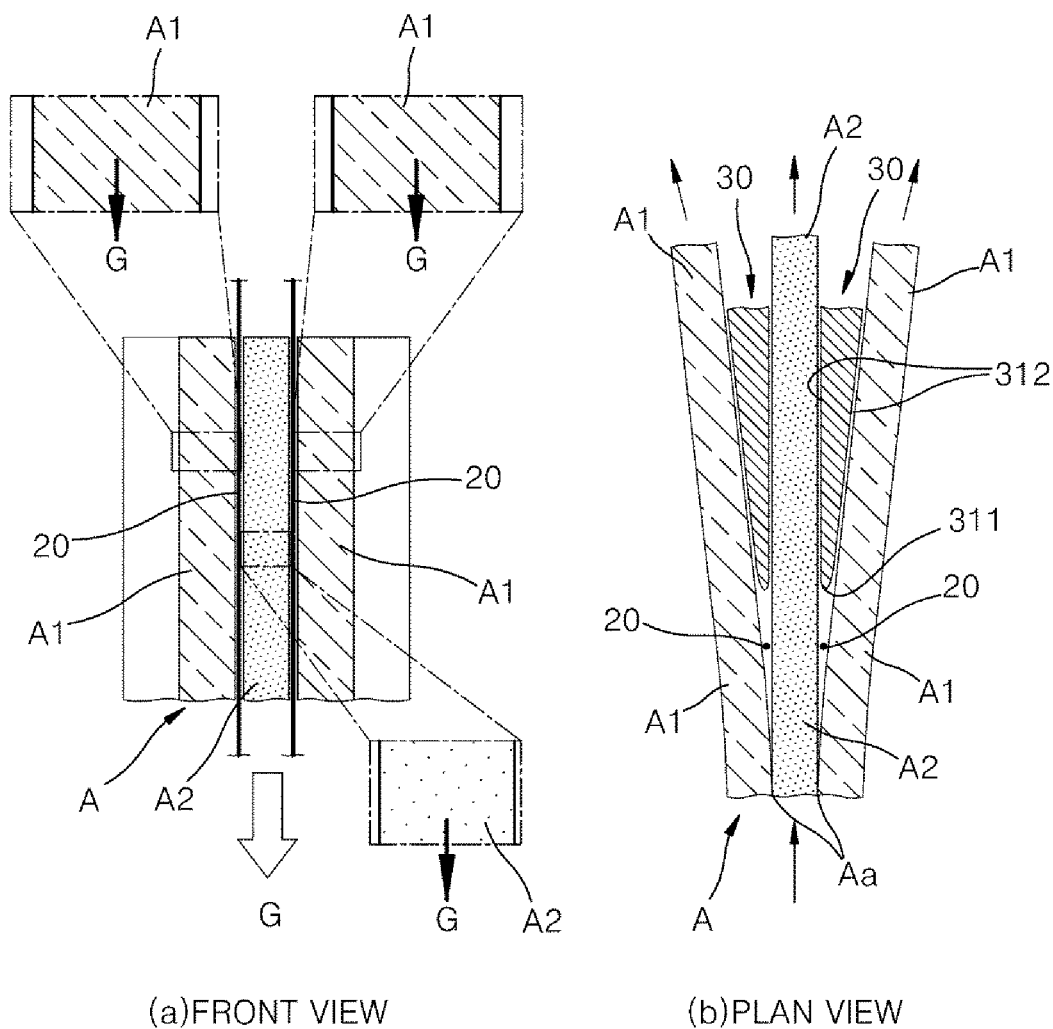
FIG. 3 is an enlarged view obtained by enlarging front and plan views of a solar panel in a disassembling process of a double-sided solar panel in accordance with the disassembling operation illustrated in FIG. 2.
Figure 5:
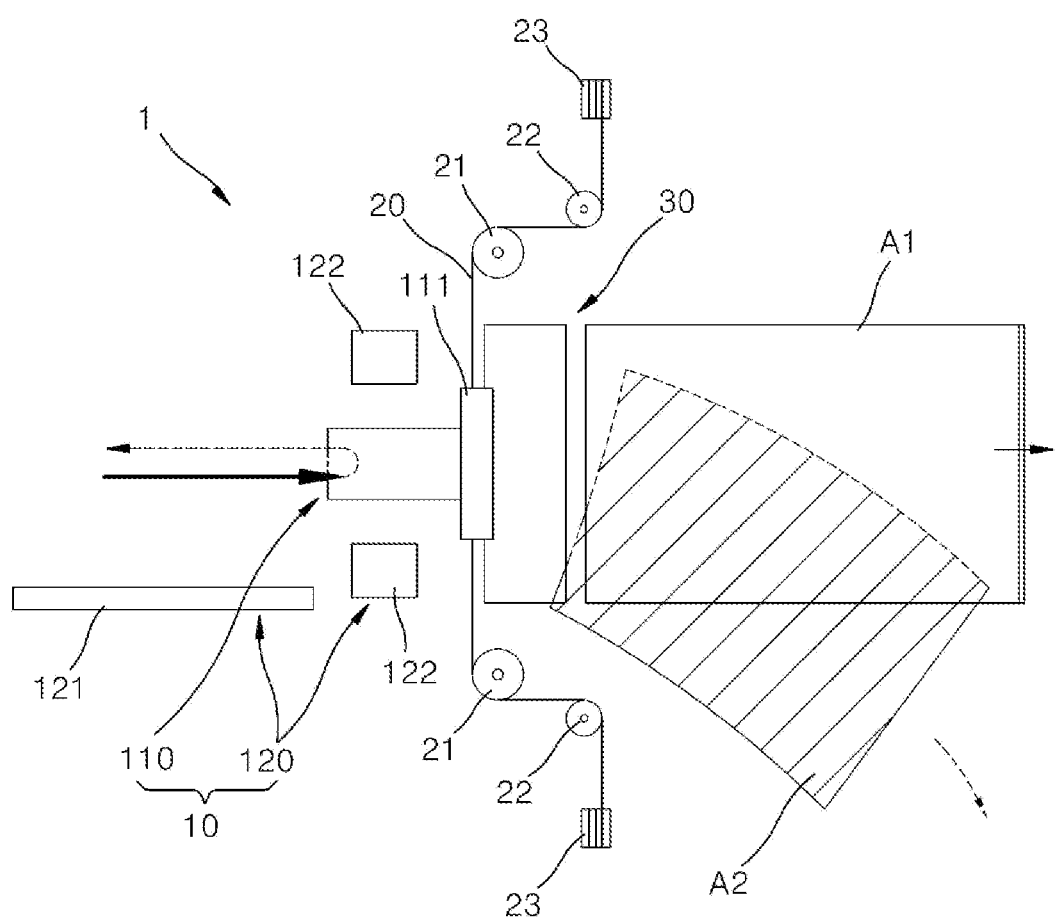
FIG. 5 is a view illustrating a processing state of the solar panel after the disassembling operation illustrated in FIG. 2.
Figure 6:
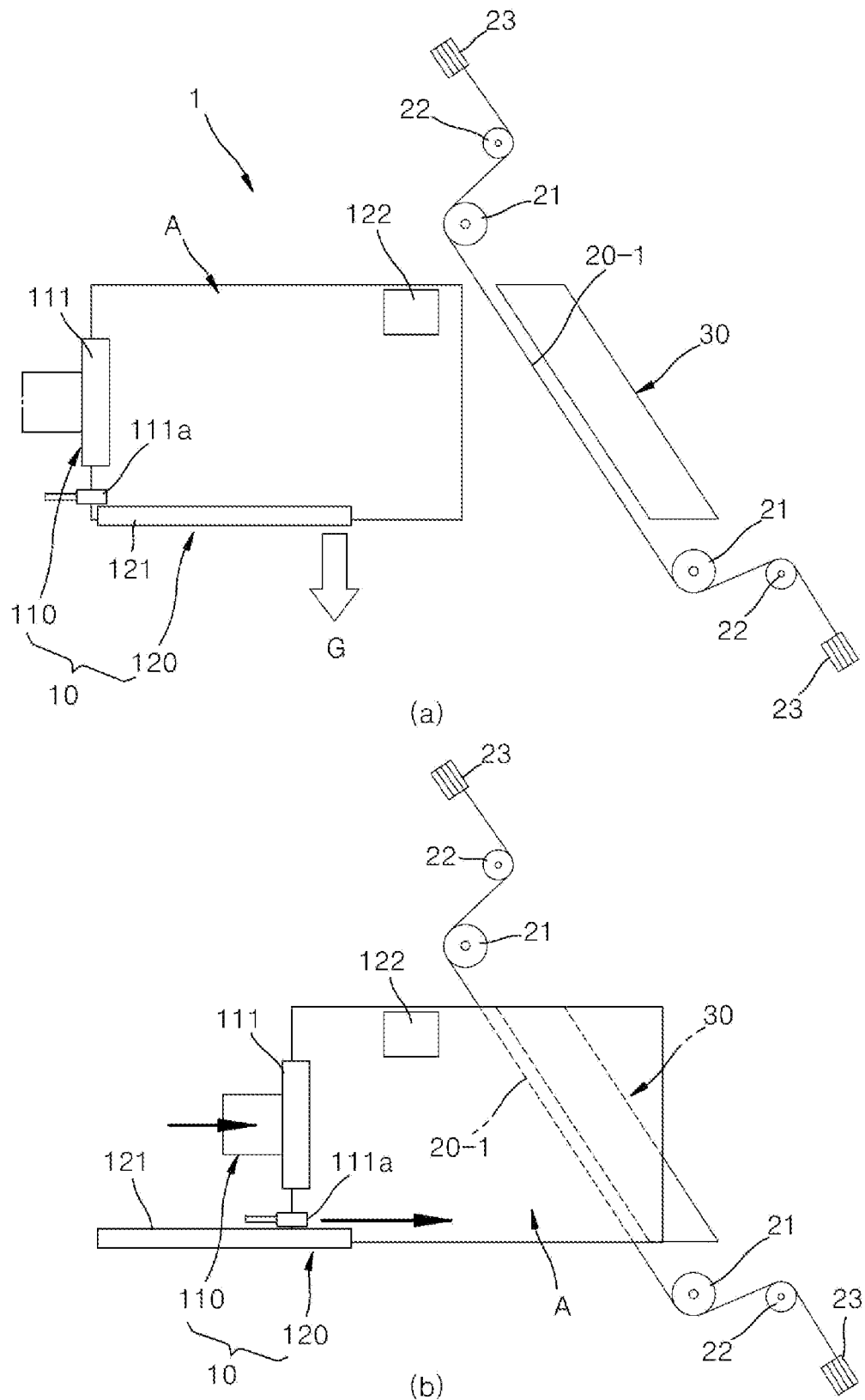
FIG. 6 is a view illustrating a modification example of the wire-shaped cutting blade.

FIG. 3 is an enlarged view obtained by enlarging front and plan views of the solar panel in a disassembling process of the double-sided solar panel in accordance with the disassembling operation illustrated in FIG. 2. FIG. 4 is an enlarged view obtained by enlarging front and plan views of the solar panel in a disassembling process of the single-sided solar panel in accordance with the disassembling operation illustrated in FIG. 2. FIG. 5 is a view illustrating a processing state of the solar panel after the disassembling operation illustrated in FIG. 2. FIG. 6 is a view illustrating a modification example of the wire-shaped cutting blade.

First, with reference to FIG. 2, the solar panel A is moved perpendicularly to the direction of gravity G in a state of being stood in the direction of gravity G by the supply module 10 (see (b) of FIG. 2). The solar panel A is stood by the holding unit 110 to expose the above-described bond line (see Aa in FIG. 1) upward and downward, and thus the bonding surfaces formed by bonding the glass plate and the film layer to each other are arranged toward upper and lower sides. The bonding surfaces are virtually parallel to the outer surface of the glass plate A1, and thus an arrangement direction of the bonding surfaces inside the bond line can be determined from an arrangement direction of the outer surfaces of the glass plate A1. A state where the solar panel is stood vertically as described above is illustrated in (a) of FIG. 2.

When the holding unit 110 moves the solar panel A in parallel to a horizontal direction, the solar panel A is intersected past the wire-shaped cutting blades 20 perpendicular to the movement direction, as illustrated in (b) of FIG. 2. The solar panel A is guided by the guide unit 120 described above. As described above, in a state where the entire solar panel A is stood vertically, the solar panel can be intersected past the wire-shaped cutting blades 20, and the glass plate and the film layer can be separated from each other.

Loads applied to the glass plate A1 and the film layer A2, respectively, in the disassembling process are illustrated in FIGS. 3 and 4. As illustrated in (a) of FIG. 3, the wire-shaped cutting blades 20 arranged in the direction of gravity G are inserted into the bond line Aa between the glass plate A1 and the film layer A2 arranged in the same direction as the direction of gravity and cut the bonding surface between the glass plate A1 and the film layer A2. In this case, as illustrated in (a) of FIG. 3, each of the glass plate A1 and the film layer A2 receives a load not in a direction perpendicular to the bonding surface, but in a direction parallel thereto.

As described above, since the load is not applied to the glass plate A1 and the film layer A2 perpendicularly to the bonding surface, the cut surfaces formed by cutting the bonding surface do not adhere to each other and maintain a separated state. Consequently, even when the fine wire-shaped cutting blades 20 having a very small diameter performs cutting, the cut surfaces can maintain the separated state as it is. In addition, since the wire-shaped cutting blades 20 can form the sharp cut surfaces, the glass plate A1 and the film layer A2 are clearly separated from each other such that the subsequent processing is also facilitated.

In addition, as illustrated in (b) of FIG. 3, since the wedge body 30 fulfills a function of parting the cut surfaces formed at the film layer A2 and the glass plate A1 behind the wire-shaped cutting blades 20, the film layer A2 and the glass plate A1 are more easily separated as separate parts from each other. The wedge body 30 has the two contact surfaces 312 which can increase a distance between both a cut surface of the film layer A2 and a cut surface of the glass plate A1, the two contact surfaces 312 being parted at an angle with each other from the edge 311.

A cutting process for the glass plates A1 and the film layer A2 is simultaneously performed on the pair of glass plates A1 bonded to both surfaces of the film layer A2 by the pair of wire-shaped cutting blades 20 formed by double blades. Consequently, as illustrated in (b) of FIG. 3, the double-sided panel including the pair of glass plates A1 bonded to both surfaces of the film layer A2 can also be very rapidly disassembled in one process. The separated film layer A2 can be discharged through a different path from the two glass plates A1 by passing between the pair of wedge bodies 30.

With reference to FIG. 4, the same cutting process is also performed on the single-sided solar panel including one glass plate A1. In a state where a single-sided solar panel A' is also stood in the direction of gravity G, the bonding surface placed in the same direction is sharply cut by the wire-shaped cutting blade 20 disposed in the direction of gravity G. Since a load is not applied to the glass plate A1 and the film layer A2 perpendicularly to the bonding surface, the cut surfaces formed by cutting the bonding surface do not adhere to each other and maintain a separated state.

In addition, since the wedge body 30 fulfills a function of parting the cut surfaces formed at the film layer A2 and the glass plate A1 behind the wire-shaped cutting blades 20, the film layer A2 and the glass plate A1 are more easily separated as separate parts from each other. As described above, the wire-shaped cutting blade 20 illustrated in FIG. 1 can be replaced with double blades or a single blade, and thereby easily disassembling both the double-sided panel and the single-sided panel.

With reference to FIG. 5, the glass plate A1 and the film layer A2 separated from each other by the wire-shaped cutting blades 20 can be discharged through different paths from each other. Although not illustrated, the glass plate A1 can be discharged through a discharge unit such as a separate conveyor to be stored on a storage rack. When the double-sided panel is disassembled and the pair of glass plates A1 is simultaneously disassembled, the pair of glass plates A1 can be simultaneously discharged through the same path or different paths from each other. The film layer A2 between the two glass plates A1 can fall by self-load in the direction of gravity and can be collected by providing a disposal basket (not illustrated) at a lower side.

The end of the horizontal moving pusher 111 which is the holding unit 110 can approach the wire-shaped cutting blades 20 and can push the solar panel while horizontally moving to be close to the wire-shaped cutting blade to the extent that the horizontal moving pusher does not come into contact with the wire-shaped cutting blade. As described above, a separating sequence is ended, the horizontal moving pusher 111 retreats and returns to an original location thereof, and the same processes can be repeatedly performed on the next solar panel.

Meanwhile, with reference to FIG. 6, a wire-shaped cutting blade 20-1 can be disposed obliquely to have a constant inclined angle with respect to the movement direction of the solar panel A. The wire-shaped cutting blade 20-1 can be disposed obliquely with respect to the parallel movement direction of the solar panel A such that a contact area can be changed while the wire-shaped cutting blade comes into contact with the solar panel A. Even when the inclined angle changes, the wire-shaped cutting blade 20-1 is positioned on a plane parallel to the bonding surface to which the glass plate and the film layer are bonded, and thus the wire-shaped cutting blade can perform the cutting between the glass plate and the film layer without difficulty.

For example, when the solar panel A is moved, the obliquely disposed wire-shaped cutting blade 20-1 can gradually increase a contact area by starting to come into contact with a vertex at one side at which two edges of the solar panel A meet each other. Conversely, when the wire-shaped cutting blade leaves the solar panel A, the wire-shaped cutting blade can leave the solar panel to an opposite side as the contact area is gradually decreased. Consequently, while the wire-shaped cutting blade 20-1 is in contact with the solar panel, an effect of decreasing the contact area is achieved such that frictional heat generated in the wire-shaped cutting blade can be decreased. In addition, such a configuration described above can be advantageous in that the wire-shaped cutting blade 20-1 is cooled or fatigue or damage accumulated in the wire-shaped cutting blade 20-1 is reduced due to the decrease in contact area per hour. In addition, the cutting blade comes into contact with the solar panel A in a manner of obliquely cutting the solar panel, and thus a cutting effect can be increased.

As described above, when the wire-shaped cutting blade 20-1 is obliquely disposed, a configuration of the supply module 10 can be modified to include an auxiliary pusher 111a or the like which can push the solar panel A deeper toward the wire-shaped cutting blade 20-1, and thereby the process can be more smoothly performed.

In a state where the solar panel A is stood to expose the bond line upward and downward as described above, the solar panel can be moved in the parallel direction such that the loads of the glass plate and the film layer are not perpendicularly applied to the bonding surface. The wire-shaped cutting blade 20 or 20-1 parallel to the bonding surface cuts the bonding surface and forms the cut surfaces in a moving process; however, since the loads of the glass plate and the film layer are not applied in the direction perpendicular to the bonding surface, a separated state of the cut surfaces formed by cutting the bonding surface is maintained as it is. Consequently, the double-sided or single-sided solar panel can be effectively disassembled by using the fine wire-shaped cutting blades.

Hereinafter, with reference to FIGS. 7 to 10, the second, third, and fourth embodiments will be described in detail. The following description focuses on configurations different from those of the above-described embodiment for conciseness and clearness of the description. Since configurations which are not otherwise described are the same as those of the above-described embodiment, the above description thereof will be referred to instead of repeating the description thereof.

Figure 7:
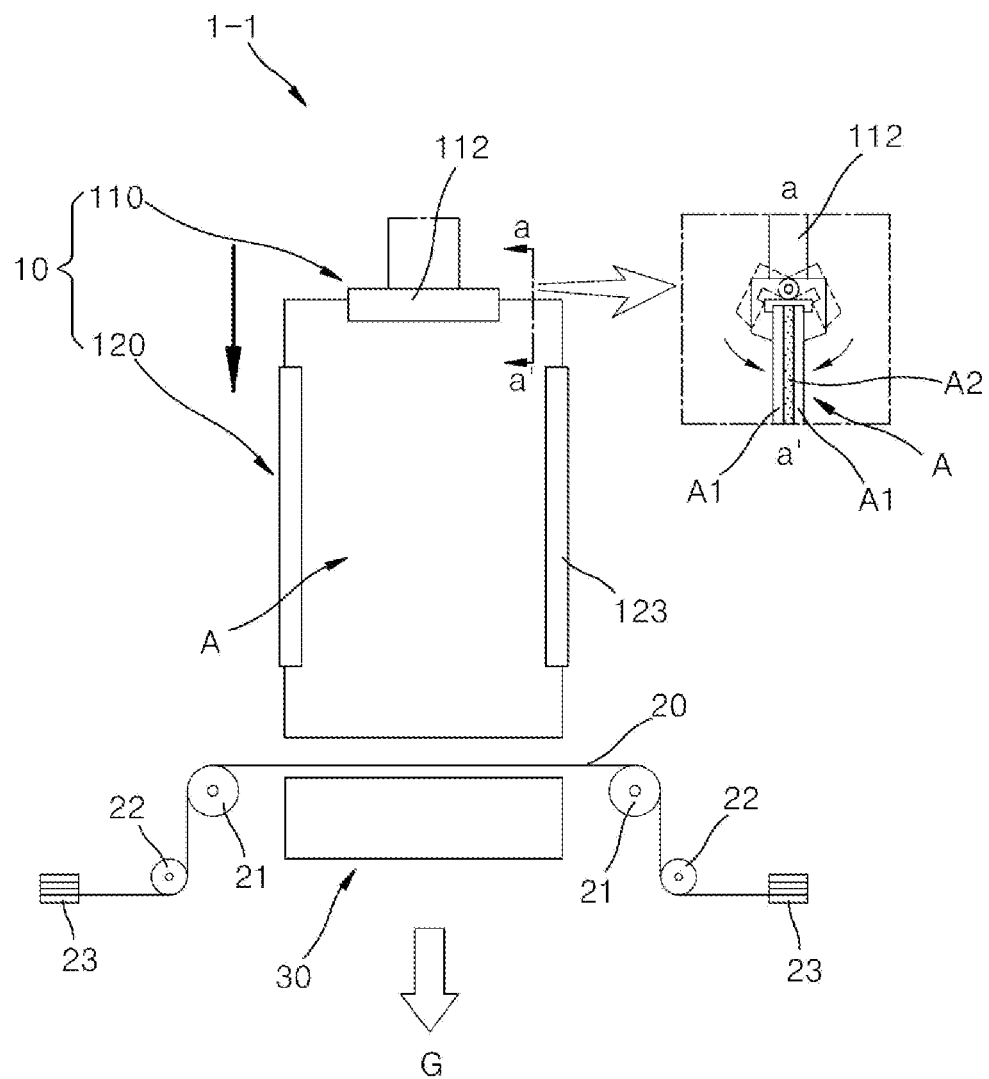
FIG. 7 is a side view illustrating a solar panel disassembling apparatus according to a second embodiment of the present invention.

FIG. 7 is a side view illustrating a solar panel disassembling apparatus according to the second embodiment of the present invention.

With reference to FIG. 7, in a solar panel disassembling apparatus 1-1 according to the second embodiment of the present invention, both the bonding surface between the glass plate A1 and the film layer A2 and the parallel movement direction of the solar panel A can be set to be parallel to the direction of gravity G. That is, the solar panel can be moved in parallel to the direction of gravity G (in a perpendicular direction to the ground) in a state where the bonding surface of the solar panel A is stood to be parallel to the direction of gravity G (perpendicular to the ground). Also in this manner, the wire-shaped cutting blades 20 can cut the bonding surface to separate the glass plate and the film layer from each other while a state where the loads of the glass plate and the film layer are not perpendicularly applied to the bonding surface is maintained.

In the second embodiment, the supply module 10 can be configured to include a first holding unit that holds one edge of the solar panel A and fixes the solar panel A and a first guide unit that comes into contact with another part of the solar panel A with which the first holding unit does not come into contact and that guides the solar panel A in a movement direction. A lifting/lowering pincer unit 112 of the second embodiment is another example of the first holding unit, and a lifting/lowering guide bar 123 is another example of the first guide unit.

The supply module 10 of the second embodiment can also be formed by combining the holding unit 110 and the guide unit 120. The lifting/lowering pincer unit 112 has movable pincers formed at an end thereof as illustrated in the enlarged view (partial cross-sectional view taken along line a-a') of FIG. 7 and can be lifted and lowered. Consequently, the lifting/lowering pincer unit can hold an upper edge of the solar panel A and fix the solar panel and can move upward and downward. For example, the movable pincers can be moved by opening or closing a pincer part and can be formed to have various structures in which the solar panel A can be releasably held.

For example, the lifting/lowering guide bar 123 can have a guide structure that is formed to come into contact with a side edge of the solar panel A which is moved in the direction of gravity G. Since shapes and structures of the holding unit and the guide unit can be modified depending on a state, the shapes and the structures do not need to be limited to examples illustrated in the drawings.

The wire-shaped cutting blades 20 can be disposed below the supply module 10 in a direction perpendicular to the movement direction of the solar panel A, that is, parallel to the ground. The above-described wedge bodies 30 can be disposed behind the wire-shaped cutting blades 20 to be contiguous to the wire-shaped cutting blades 20 in the movement direction of the solar panel A. Since the movement direction is the direction of gravity G, the supply module 10, the wire-shaped cutting blades 20, and the wedge bodies 30 can be arranged in this order from top to bottom.

In this state, the solar panel A can be disassembled while being moved past the wire-shaped cutting blades 20 from the upper side to the lower side. The same double blade structure or single blade structure of the wire-shaped cutting blade 20 and the same separation operation for the cut surfaces by using the wedge bodies 30 are applied to the structure of the second embodiment. In addition, similarly to the modification example described above, the disposition of the wire-shaped cutting blades 20 can also be modified such that the wire-shaped cutting blades are arranged obliquely with respect to the movement direction of the solar panel A.

Even when the process proceeds in this state, similarly to the above-described embodiment, the loads of the glass plate and the film layer, respectively, are applied in parallel to the bonding surface and are not applied perpendicularly to the bonding surface. Consequently, the cut surfaces formed by cutting the bonding surface do not adhere to each other and maintain a separated state. Consequently, even when the fine wire-shaped cutting blades 20 having a very small diameter performs cutting, the cut surfaces can maintain the separated state as it is. In addition, since the wire-shaped cutting blades 20 can form the sharp cut surfaces, the glass plate A1 and the film layer A2 are clearly separated from each other.

Figure 8:
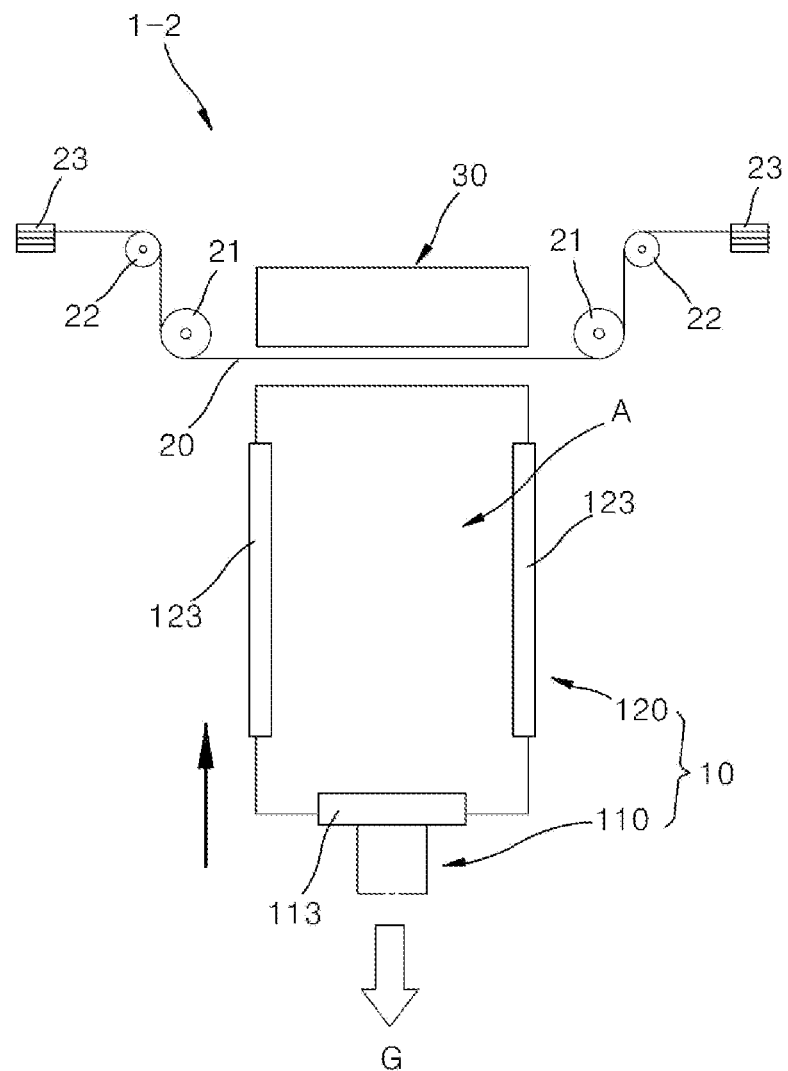
FIG. 8 is a side view illustrating a solar panel disassembling apparatus according to a third embodiment of the present invention.

FIG. 8 is a side view illustrating a solar panel disassembling apparatus according to a third embodiment of the present invention.

With reference to FIG. 8, in a solar panel disassembling apparatus 1-2 according to the third embodiment of the present invention, similarly to the second embodiment, both the bonding surface between the glass plate and the film layer and the parallel movement direction of the solar panel A can be set to be parallel to the direction of gravity G.

Incidentally, in the third embodiment, the movement direction of the solar panel A can be parallel to the direction of gravity G; however, the solar panel can be cut while being lifted without being lowered in the direction of gravity G. That is, with reference to the second and third embodiments, the disassembling process can be performed in a state where the solar panel A is stood in the direction of gravity G and lowered in the direction of gravity G or is parallel to the direction of gravity G and lifted in an opposite direction of the gravity G.

Also in the third embodiment, the supply module 10 can be configured to include a first holding unit that holds one edge of the solar panel A and fixes the solar panel A and a first guide unit that comes into contact with another part of the solar panel A with which the first holding unit does not come into contact and that guides the solar panel A in a movement direction. A lifting/lowering pusher 113 of the third embodiment is still another example of the first holding unit, and the lifting/lowering guide bar 123 is the other example of the first guide unit.

The supply module 10 of the third embodiment can also be formed by combining the holding unit 110 and the guide unit 120. The lifting/lowering pusher 113 can have a fixing structure such as a holder which supports a lower edge of the solar panel A and fixes the solar panel, the fixing structure being provided at an end of the lifting/lowering pusher, and the lifting/lowering pusher can be driven on a straight line to lift the solar panel A. The lifting/lowering guide bar 123 can be disposed to come into contact with a side edge of the solar panel A.

The wire-shaped cutting blades 20 can be disposed above the supply module 10 in a direction perpendicular to the movement direction of the solar panel A, that is, parallel to the ground. The above-described wedge bodies 30 are disposed behind the wire-shaped cutting blades 20 to be contiguous to the wire-shaped cutting blades 20 in the movement direction of the solar panel A. In the third embodiment, since the movement direction is an upward direction opposite to the gravity G, the supply module 10, the wire-shaped cutting blades 20, and the wedge bodies 30 can be arranged in this order from bottom to top.

In this disposition, the solar panel A can be disassembled while being moved past the wire-shaped cutting blades 20 from the lower side to the upper side. Also in the third embodiment, the same double blade structure or single blade structure of the wire-shaped cutting blade 20 and the same separation operation for the cut surfaces by using the wedge bodies 30 which are described above are applied to the structure of the third embodiment. In addition, similarly to the modification example described above, the disposition of the wire-shaped cutting blades 20 can also be modified such that the wire-shaped cutting blades are arranged obliquely with respect to the movement direction of the solar panel A.

Even when the process proceeds in this state, also similarly to the above-described embodiments, the loads of the glass plate and the film layer, respectively, are applied in parallel to the bonding surface and are not applied perpendicularly to the bonding surface. Consequently, the cut surfaces formed by cutting the bonding surface do not adhere to each other and maintain a separated state. Consequently, even when the fine wire-shaped cutting blades 20 having a very small diameter performs cutting, the cut surfaces can maintain the separated state as it is. In addition, since the wire-shaped cutting blades 20 can form the sharp cut surfaces, the glass plate A1 and the film layer A2 are clearly separated from each other.

Figure 9:
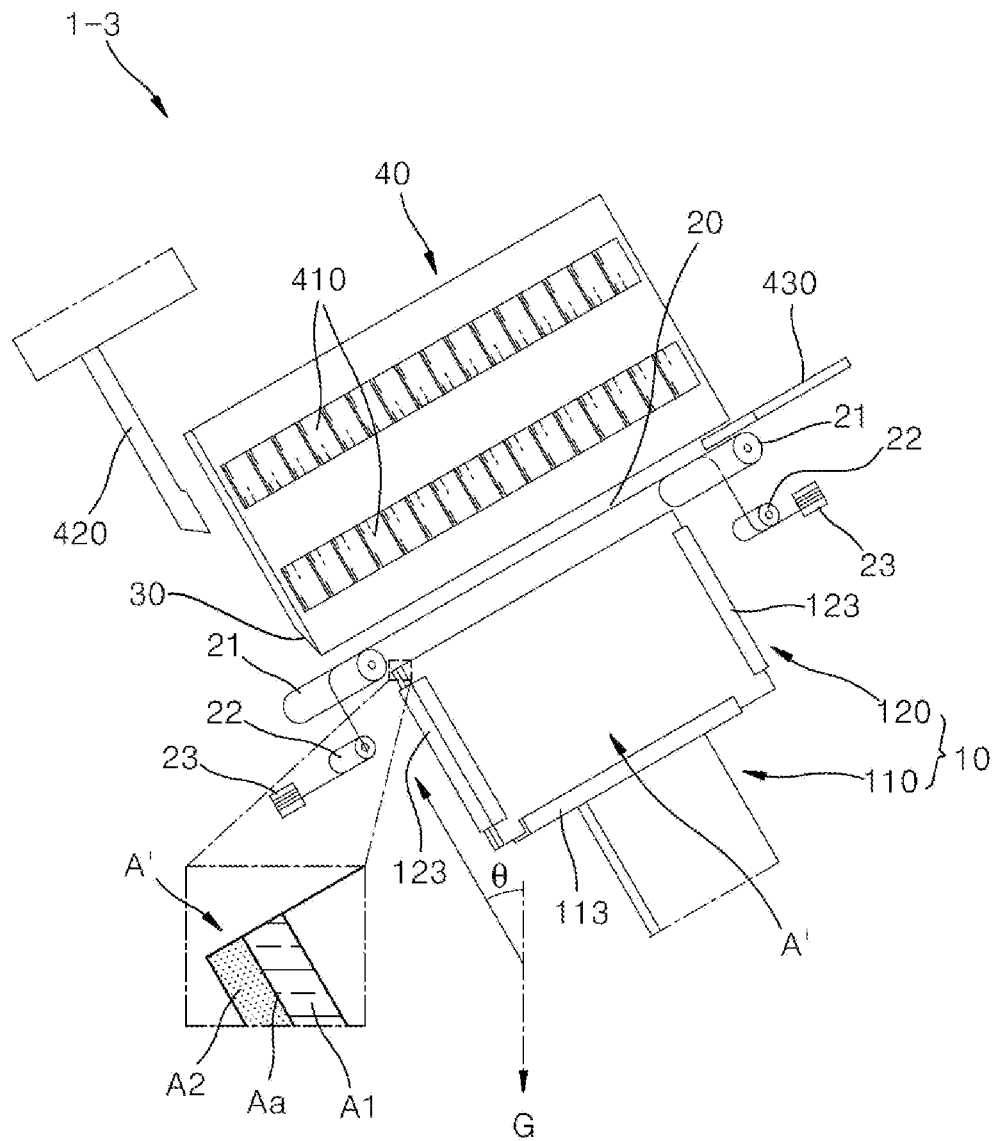
FIGS. 9 and 10 are perspective views illustrating a configuration and an operation of a solar panel disassembling apparatus according to a fourth embodiment of the present invention.
Figure 10:
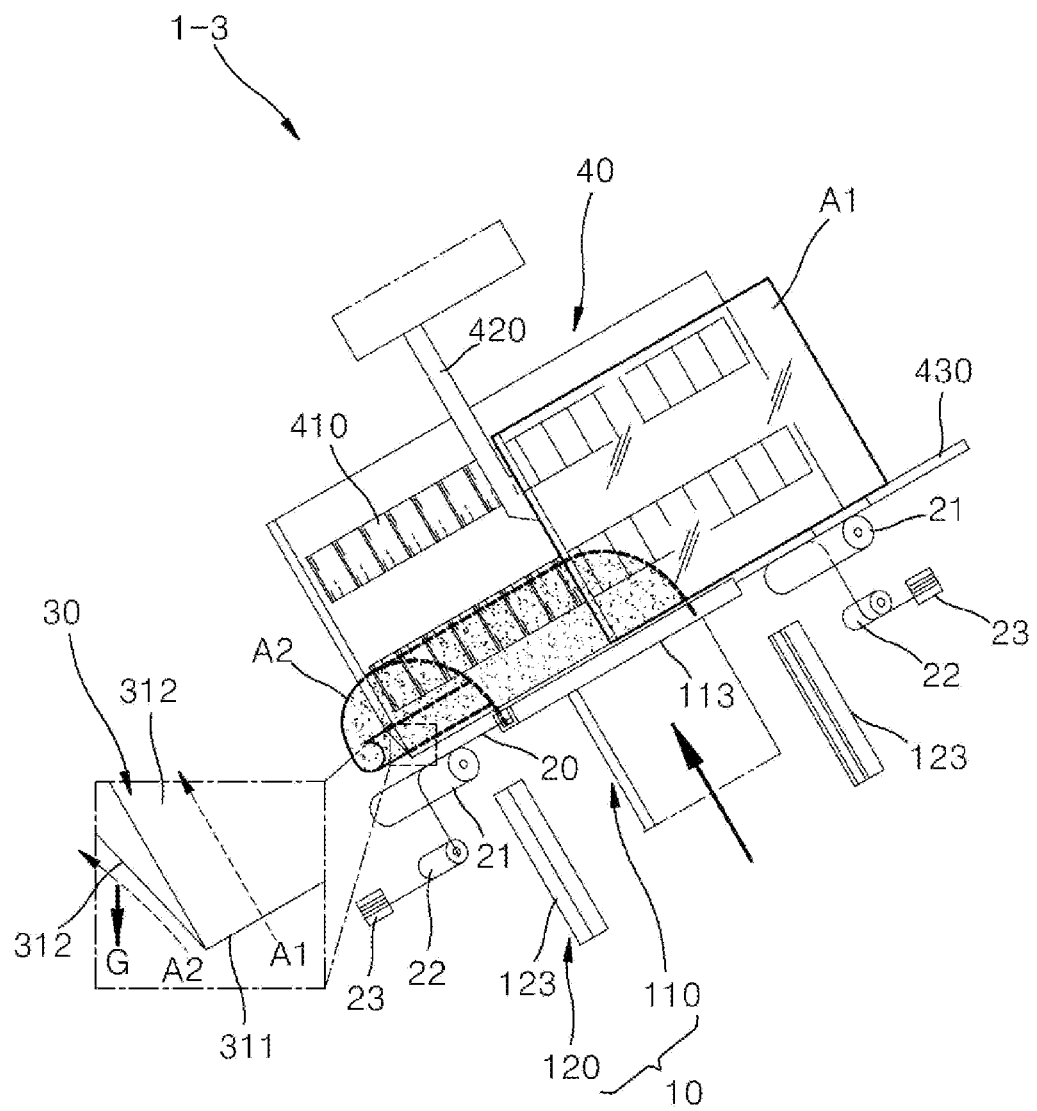

FIGS. 9 and 10 are perspective views illustrating a configuration and an operation of a solar panel disassembling apparatus according to the fourth embodiment of the present invention.

With reference to FIG. 9, in a solar panel disassembling apparatus 1-3 according to the fourth embodiment of the present invention, both the bonding surface of the solar panel A and the parallel movement direction of the solar panel A can be obliquely inclined with respect to the direction of gravity G. A direction in which the supply module 10 moves the solar panel A can be a direction inclined at a certain angle (θ) with respect to the direction of gravity G. The solar panel A can be cut by the wire-shaped cutting blades 20 while being lifted obliquely at the corresponding angle.

With reference to the fourth embodiment of the present invention, the solar panel A of the present invention is disassembled in a state of being stood to expose the bond line Aa upward and downward but does not need to be stood to be perfectly vertical. In particular, in a case of the single-sided panel including one glass plate A1, the cut surfaces formed by cutting the bonding surface can be more effectively separated from each other while a load is inhibited from being applied in the direction perpendicular to the bonding surface by forming a structure similar to the fourth embodiment.

The supply module 10 of the fourth embodiment is illustrated to also include a first holding unit that holds one edge of the solar panel A and fixes the solar panel A and a first guide unit that comes into contact with another part of the solar panel A with which the first holding unit does not come into contact and that guides the solar panel A in a movement direction. Similarly to the above-described embodiment, the lifting/lowering pusher 113 can be used as the first holding unit, and the lifting/lowering guide bar 123 can be used as the first guide unit. Incidentally, a lifting/lowering direction of the lifting/lowering pusher 113 and a disposition direction of the lifting/lowering guide bar 123 can be adjusted to be inclined at a certain angle (θ) with respect to the direction of gravity G.

The wire-shaped cutting blades 20 is disposed above the supply module 10 in a direction perpendicular to the movement direction of the solar panel A and parallel to the ground. The above-described wedge bodies 30 are also disposed behind the wire-shaped cutting blades 20 to be contiguous to the wire-shaped cutting blades 20 in the movement direction of the solar panel A. Since the movement direction is inclined with respect to the direction of gravity G while the movement direction is an upward direction opposite to the gravity G, the supply module 10, the wire-shaped cutting blades 20, and the wedge bodies 30 can be arranged in this order from bottom to top along an inclined plane inclined at the certain angle (θ) with respect to the direction of gravity G.

In the fourth embodiment, a discharge unit 40 having an inclined shape which supports the solar panel A is also illustrated. The wedge body 30 can be formed to be integrated with the discharge unit 40. The discharge unit 40 can be configured of an inclined plate on which discharge rollers 410 are formed, and the wedge body 30 can be disposed at an end of the inclined plate. The discharge unit 40 can have, at one side, a push stick 420 which slides and a blocking bump 430 which supports the disassembled glass plate A1 such that the glass plate does not fall.

With reference to FIG. 10, the solar panel A can be disassembled, while being moved past the wire-shaped cutting blades 20 from the lower side to the upper side in an inclined state at the certain angle. In particular, in this inclined structure, the glass plate A1 of the solar panel A is disposed on the film layer A2 in the direction of gravity (refer to the enlarged view in FIG. 9), and thereby the cut film layer A2 can be separated by self-load from the glass plate A1.

That is, since a load of the film layer A2 is applied obliquely downward to the bonding surface, a gap between the glass plate A1 and the film layer A2, which are not virtually deformed, can be increased by the gravity G. As illustrated in FIG. 10, the glass plate A1 reaches the discharge unit 40 along an upper surface of the contact surfaces 312 of the wedge body 30; however, the film layer A2 can be separated by the gravity G and fall along a lower surface of the contact surfaces 312 of the wedge body 30.

In this manner, the loads are not only inhibited from being perpendicularly applied to the bonding surface between the glass plate A1 and the film layer A2, but also the film layer A2 can be more easily separated by self-load from the glass plate A1. Consequently, since the cut surfaces formed by cutting the bonding surface do not adhere to each other and maintain a separated state, the cut surfaces can maintain the separated state as it is even when the fine wire-shaped cutting blades 20 having a very small diameter performs the cutting. In addition, since the wire-shaped cutting blades 20 can form the sharp cut surfaces, the glass plate A1 and the film layer A2 are clearly separated from each other such that the subsequent processing is also facilitated.

Also in the fourth embodiment, similarly to the modification example described above, the disposition of the wire-shaped cutting blades 20 can also be modified such that the wire-shaped cutting blades are arranged obliquely with respect to the movement direction of the solar panel A. In particular, the fourth embodiment is more advantageous for disposal of the single-sided solar panel A' including one glass plate A1.

The glass plate A1 separated from the film layer A2 can be pushed by the push stick 420 to be supported on the blocking bump 430 and can be moved by the discharge rollers 410 to be discharged to a predetermined place. The film layer A2 can be collected by disposing a basket (not illustrated) at the lower side. In this manner, the solar panels in which the glass plate A1 and the film layer A2 are bonded to each other can be effectively disassembled using the wire-shaped cutting blades 20.

According to the present invention, a glass plate and a film layer of a solar panel can be very effectively separated from each other by using a cutting blade formed by a fine wire. The fine wire produces high pressure between the glass plate and the film layer to form a clean cut surface, and the formed cut surface can be maintained not to be re-bonded. The present invention can be applied to not only a general single-sided solar panel (including one glass plate) but also a double-sided solar panel (including two glass plates bonded to both surfaces of the film layer) without difficulty and can simultaneously separate the glass plates from the double-sided solar panel, thus being advantageous for process simplification.

As described above, the embodiments of the present invention are described with reference to the accompanying drawings; however, a person of ordinary skill in the art to which the present invention pertains can understand that the present invention can be realized as another example without changing the technical idea or an essential feature of the present invention. Therefore, the embodiments described above need to be understood, in every aspect, as exemplified embodiments and not as embodiments to which the present invention is limited.

What is claimed is:

1. A solar panel disassembling apparatus comprising:
   a supply module configured to stand and fix a solar panel having a glass plate and a film layer bonded to the glass plate such that a bond line between the glass plate and the film layer is exposed upward and downward, the supply module configured to move the solar panel in a parallel direction parallel to a bonding surface between the glass plate and the film layer;
   a wire-shaped cutting blade disposed in front of the solar panel in a movement direction of the solar panel to have a distance from the supply module and in parallel to the bonding surface, the wire-shaped cutting blade configured to separate the glass plate and the film layer from each other while the solar panel is being moved in the movement direction;
   at least one wedge body disposed behind the wire-shaped cutting blade in the movement direction of the solar panel, the at least one wedge body having an edge facing the wire-shaped cutting blade and two contact surfaces which are parted at an angle with each other from the edge to come into contact with the film layer and the glass plate, respectively,
   wherein the supply module includes (i) a first holding unit and a first guide unit, or (ii) a second holding unit and a second guide unit,
   wherein the first holding unit is configured to hold one edge, on which the bonding surface is exposed, of the solar panel and fix the solar panel and the first guide unit that comes into contact with another part of the solar panel with which the first holding unit does not come into contact and that is configured to guide the solar panel in the movement direction,
   wherein the second holding unit configured to hold outer surfaces of the solar panel and fix the solar panel and the second guide unit that comes into contact with another part of the solar panel with which the second holding unit does not come into contact and that is configured to guide the solar panel in the movement direction.

2. The solar panel disassembling apparatus according to claim 1, wherein the supply module configured to hold and move the solar panel in the parallel direction such that loads of the glass plate and the film layer are not perpendicularly applied to the bonding surface.

3. The solar panel disassembling apparatus according to claim 2, wherein the solar panel is a double-sided panel including a pair of glass plates bonded to both surfaces of the film layer, and the wire-shaped cutting blade is configured of a pair of double blades which is disposed side by side to simultaneously separate the pair of glass plates from the film layer.

4. The solar panel disassembling apparatus according to claim 1, wherein the supply module is configured to move the solar panel in the parallel direction while supporting an edge of the solar panel such that a load of the solar panel is concentrated on at least one edge of the glass plate and the film layer.

5. The solar panel disassembling apparatus according to claim 1, wherein the wire-shaped cutting blade is intersected perpendicularly to a parallel movement direction of the solar panel.

6. The solar panel disassembling apparatus according to claim 5, wherein the bonding surface is parallel to the direction of gravity, and the parallel movement direction of the solar panel is perpendicular to the direction of gravity.

7. The solar panel disassembling apparatus according to claim 5, wherein the bonding surface and the parallel movement direction of the solar panel are both parallel to the direction of gravity.

8. The solar panel disassembling apparatus according to claim 5, wherein the bonding surface and the parallel movement direction of the solar panel are both obliquely inclined with respect to the direction of gravity.

9. The solar panel disassembling apparatus according to claim 8, wherein the glass plate of the solar panel is disposed above the film layer in the direction of gravity such that the cut film layer is separated by self-load from the glass plate.

10. The solar panel disassembling apparatus according to claim 1, wherein the wire-shaped cutting blade is disposed obliquely with respect to the parallel movement direction of the solar panel such that a contact area changes while the wire-shaped cutting blade comes into contact with the solar panel.

11. The solar panel disassembling apparatus according to claim 10, wherein the bonding surface is parallel to the direction of gravity, and the parallel movement direction of the solar panel is perpendicular to the direction of gravity.

12. The solar panel disassembling apparatus according to claim 10, wherein the bonding surface and the parallel movement direction of the solar panel are both parallel to the direction of gravity.

13. The solar panel disassembling apparatus according to claim 10, wherein the bonding surface and the parallel movement direction of the solar panel are both obliquely inclined with respect to the direction of gravity.

14. The solar panel disassembling apparatus according to claim 13, wherein the glass plate of the solar panel is disposed above the film layer in the direction of gravity such that the cut film layer is separated by self-load from the glass plate.

15. The solar panel disassembling apparatus according to claim 1, wherein the supply module includes the first holding unit and the first guide unit.

16. The solar panel disassembling apparatus according to claim 1, wherein the supply module includes the second holding unit and the second guide unit.

17. The solar panel disassembling apparatus according to claim 1, wherein the wire-shaped cutting blade includes at least one of:
   a wire saw configured to be driven in a tension direction; and
   a heating wire which is configured to perform melting between the glass plate and the film layer with heat to cut the glass plate and the film layer from each other.

* * * * *